United States Patent [19]

McGregor et al.

[11] Patent Number: 4,747,092
[45] Date of Patent: May 24, 1988

[54] SOUND REPRODUCTION APPARATUS

[76] Inventors: Gordon A. McGregor, 9 Mafeking Terrace, Neilston, Refrewshire; Alexander D. McLachlan, 2 Craigfaulds Avenue, Paisley, Refrewshire, both of Scotland

[21] Appl. No.: 862,748
[22] Filed: May 13, 1986
[51] Int. Cl.$^4$ ............................................. G11B 21/16
[52] U.S. Cl. ...................................... 369/247; 369/244
[58] Field of Search ............... 369/244, 246, 247, 248, 369/249, 255, 251, 252, 218

[56] References Cited

U.S. PATENT DOCUMENTS

| | | | |
|---|---|---|---|
| 3,556,537 | 1/1971 | Stacy | 369/247 |
| 3,865,384 | 2/1975 | Yoshida | 369/244 |
| 4,063,285 | 12/1977 | Nagaoka | 369/247 |
| 4,138,121 | 2/1979 | Nakajima et al. | 369/247 |
| 4,225,142 | 9/1980 | Zolt | 369/247 |
| 4,570,253 | 2/1986 | Firebaugh | 369/244 |

Primary Examiner—Steven L. Stephan
Attorney, Agent, or Firm—Ratner & Prestia

[57] ABSTRACT

In conventional audio disc playback apparatus the pick up arm is mounted on the turntable baseplate. Thus, the pick up arm is subject to vibration produced by the rotation of the turntable and its associated motor.

Sound reproduction apparatus comprises a turntable 1, a pick up arm 2 and clamp apparatus 3 for attachment of the pick up arm 2 to a wall 4. The clamp apparatus 3 comprises a wall mounting bracket 5, a length adjustment tube 6, a distance bar 7 and a pick up arm clamp fork 8. Locknuts 9a, 9b and 9c are also provided and the clamp fork 8 has a pair of lockable adjusters 10.

In use, the wall mounting bracket 5 is fixed to a wall by way of screws. The length adjustment tube 6 is attached to the bracket 5 and the distance bar 7 and locked in position by locknuts 9a and 9b. The clamp fork 8 is fixed to the distance bar 7 and the pick up arm 2 is fixed to the clamp fork 8 by way of the lockable adjusters 10.

3 Claims, 2 Drawing Sheets

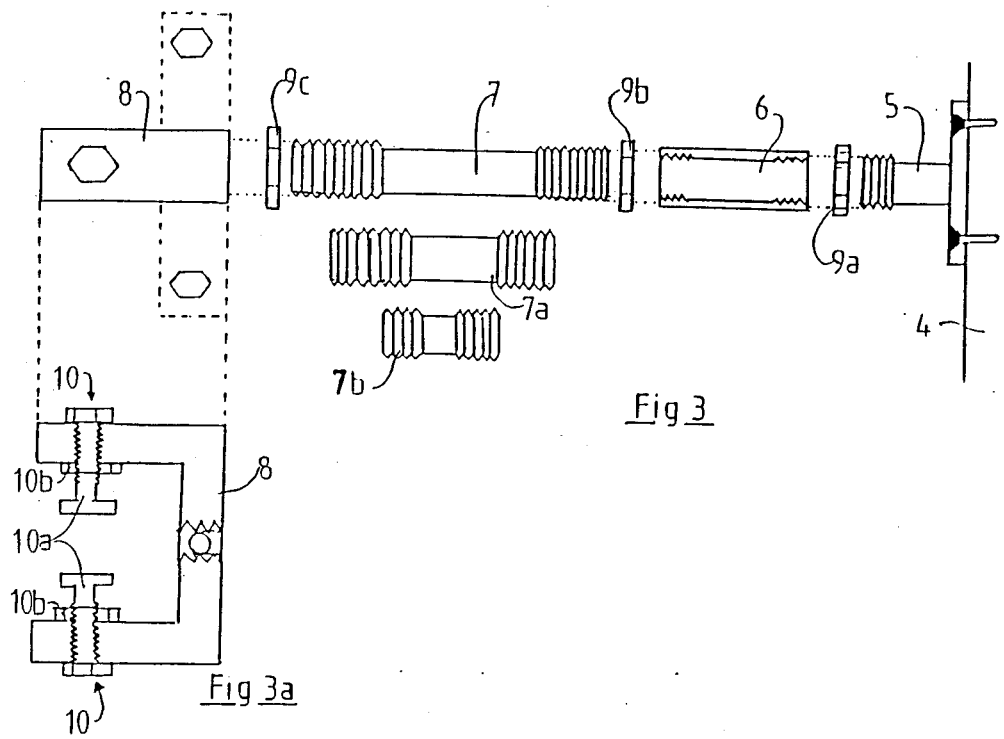
Fig 3
Fig 3a
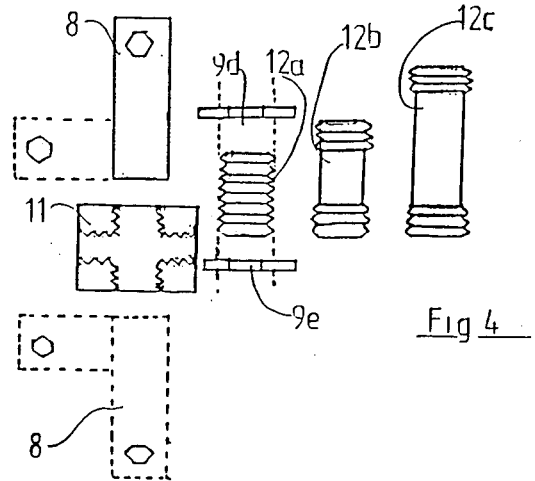
Fig 4

SOUND REPRODUCTION APPARATUS

This invention relates to sound reproduction apparatus.

BACKGROUND OF THE INVENTION

In conventional audio disc playback apparatus the pick up arm is mounted on the turntable baseplate. Thus, even in high quality systems the pick up arm is subject to vibration produced by the rotation of the turntable platter and its associated drive motor. These vibrations inevitably detract from the tracking accuracy of the stylus. Although this mistracking is small it can become a significant problem in high quality audio systems where other causes of poor sound quality have been minimised.

The problems caused by these turntable platter and motor generated vibrations have previously been dealt with by mounting the pick up arm on a damped baseplate. This can be, for example, by spring or rubber mounting. Such methods provide only a partial solution to the problem since, whilst they are effective in damping certain frequencies of vibration, they can suffer from resonant effects at other frequencies.

BRIEF SUMMARY OF THE INVENTION

According to the present invention there is provided sound reproduction apparatus comprising a rotatable turntable for an audio disc and a pick up arm for tracking an audio disc on said turntable wherein said turntable and said pick up arm are isolated from one another by means of mounting said pick up arm remote from said turntable.

Preferably, the pick up arm is mounted on remote support means, such as a wall.

Preferably also, clamp apparatus is provided for attachment of the pick up arm to said support means.

Preferably also, the clamp apparatus is adjustable for alteration of the relative positions of the pick up arm and the support means.

Preferably also, the clamp apparatus comprises a fixing member for attachment to the support means, an adjustment member and a clamp member for the pick-up arm, the adjustment member extending between the fixing member and the clamp member and being adjustable for length.

Further, according to the present invention there is provided a method of isolating an audio turntable drive motor from an audio turntable by means of mounting said drive motor and said turntable remotely from one another.

BRIEF DESCRIPTION OF THE SEVERAL VIEWS OF THE DRAWINGS

Embodiments of the present invention will now be described, by way of example, with reference to the accompanying drawings, in which:

FIG. 3 is an exploded side view of clamp apparatus of the sound reproduction apparatus of the present invention;

FIG. 3a is a plan view of part of the clamp apparatus of FIG. 3; and

FIG. 4 is an exploded side view of alternative parts for use with the clamp apparatus of FIG. 3.

DETAILED DESCRIPTION

Figure 1:
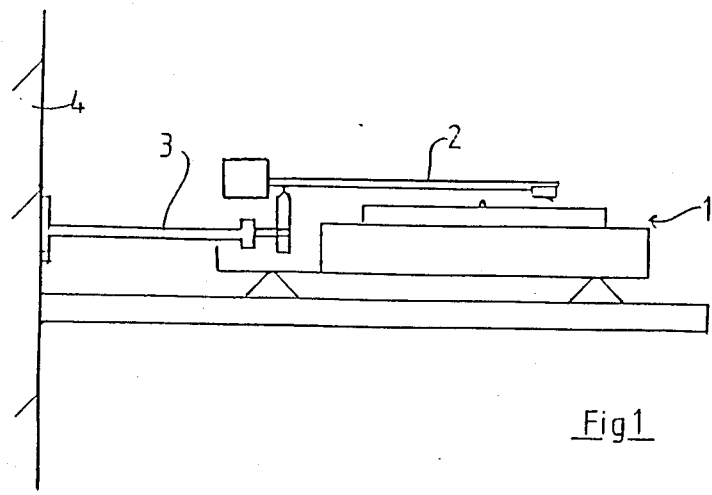
FIG. 1 is a side view of a first embodiment of sound reproduction apparatus in accordance with the present invention.

Referring to the drawings sound reproduction apparatus comprises a turntable 1, a pick up arm 2 and clamp apparatus 3 for attachment of the pick up arm 2 to a wall 4.

The clamp apparatus 3 comprises a wall mounting bracket 5, a length adjustment tube 6, a distance bar 7 and a pick up arm clamp fork 8. Locknuts 9a, 9b and 9c are also provided and the clamp fork 8 has a pair of lockable adjusters 10.

In use, the wall mounting bracket 5 is fixed to a wall by way of screws. The length adjustment tube 6 is attached to the bracket 5 and the distance bar 7 and locked in position by locknuts 9a, and 9b. The clamp fork 8 is fixed to the distance bar 7, either horizontally, as shown by the solid lines in FIG. 3 or vertically as shown by the dotted lines, and locked in position by locknut 9c. The length adjustment tube 6 has a left hand thread at one end and a right hand thread at the other end so that the tube 6 may be simply rotated to alter the overall length of the apparatus. The pick up arm 2 is fixed to the clamp fork 8 by way of the lockable adjusters 10.

In the example shown, the lockable adjusters 10 are in the form of bolts 10a which are threaded in captive locknuts 10b. The pick up arm pillar is inserted between the bolts 10a which are then tightened to hold the pick up arm in position.

The assembled apparatus is then adjusted so that the pick up arm 2 is correctly positioned in relation to the turntable 1.

Thus when the sound reproduction apparatus is in operation the pick up arm 2 is capable of improved tracking accuracy as it is not subject to any vibrations produced by the turntable 2 and its associated motor. The wall 4 may be regarded as being immovable.

The sound reproduction quality of the apparatus is thus greatly improved.

Various different configurations of the apparatus may be produced. Alternative lengths of distance bar 7a and 7b may be provided together with an adaptor block 11 and various lengths of vertical distance bar 12a, 12b and 12c and suitable locknuts 9d and 9e.

Thus by using various different combinations of parts the apparatus can be assembled in a number of alternative ways.

Examples of these are, with the fork 8 lying horizontal to the distance bar 7, with the fork at right angles to the distance bar and with the fork jaws above the plane of the assembly or below the plane of the assembly.

Figure 2:
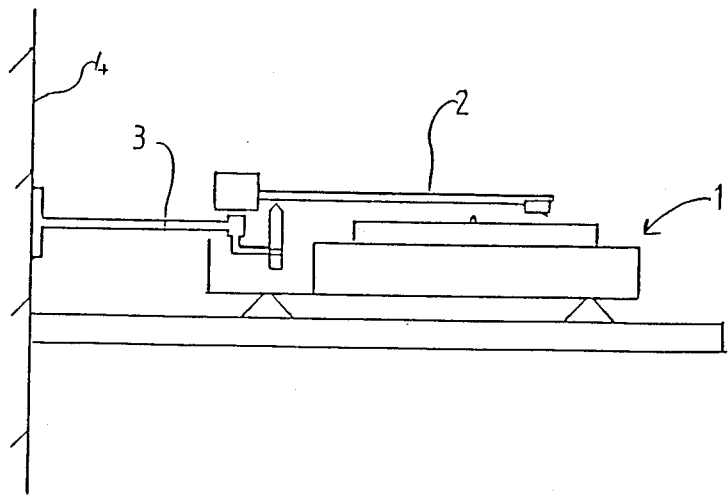
FIG. 2 is a side view of a second embodiment of sound reproduction apparatus in accordance with the present invention.

Two possible embodiments are shown in FIGS. 1 and 2. Alternative ways of fixing the pick up arm 2 to the clamp fork 8 are possible. For example the ordinary bolts may be substituted by socket headed bolts or alternatively adjustment may be provided on only one of the fork jaws. Different types of clamp forks may be arranged to allow the pick up arm to be gripped by its nut, its base or its column.

The basic concept may be extended to other components of an audio system. For example, the turntable drive motor may be isolated from the turntable.

Modifications and improvements may be made without departing from the scope of the invention.

We claim:

1. Sound reproduction apparatus comprising a rotatable turntable for an audio disc, carried in a support structure, and a pick up arm for tracking an audio disc on said turntable wherein said pick up arm is mounted on a wall of a building structure such that the pick up arm is vibrationally isolated from said support structure.

2. Sound reproduction appratus as claimed in claim 1, wherein clamp apparatus is provided for attachment of the pick up arm to said wall, said clamp apparatus providing means for adjusting the position of the pick up arm relative to the wall in three dimensions.

3. Sound reproduction apparatus as claimed in claim 2, wherein the clamp apparatus comprises a fixing member for attachment to the wall an adjustment member and a clamp member for the pick-up arm, the adjustment member extending between the fixing member and the clamp member and being adjustable for length.

* * * * *